United States Patent

Aronoff et al.

[11] Patent Number: 5,162,073
[45] Date of Patent: Nov. 10, 1992

[54] TEXTURED AIR BEARING SURFACE

[75] Inventors: Michael I. Aronoff, Goleta; Michael McNeil, Lompoc, both of Calif.

[73] Assignees: Applied Magnetics Corporation, Goleta, Calif.; NGK Insulators Ltd., Aichi, Japan

[21] Appl. No.: 755,817

[22] Filed: Sep. 6, 1991

Related U.S. Application Data

[62] Division of Ser. No. 481,556, Feb. 15, 1990, Pat. No. 5,079,657.

[51] Int. Cl.$^5$ .............................................. G11B 5/187
[52] U.S. Cl. .................................... 156/625; 156/654; 156/667
[58] Field of Search ............... 156/625, 654, 667, 656, 156/659.1; 29/306; 360/103, 122, 110

[56] References Cited

U.S. PATENT DOCUMENTS

| | | |
|---|---|---|
| 3,154,707 | 8/1964 | Bright . |
| 3,505,818 | 4/1970 | Cross et al. . |
| 3,562,620 | 2/1971 | Haslehurst . |
| 3,568,907 | 3/1971 | Watson . |
| 3,802,523 | 4/1974 | Clark . |
| 3,905,215 | 9/1975 | Wright . |
| 4,402,341 | 9/1983 | Reip . |
| 4,419,704 | 12/1983 | Radman et al. . |
| 4,523,133 | 6/1985 | Messenger . |
| 4,529,659 | 7/1985 | Hoshino et al. . |
| 4,530,021 | 7/1985 | Cameron . |
| 4,549,238 | 10/1985 | Ertingshausen et al. . |
| 4,555,739 | 11/1985 | Le Van et al. . |
| 4,589,036 | 5/1986 | Bertchy et al. . |
| 4,624,048 | 11/1986 | Hinkel et al. . |
| 4,649,448 | 3/1987 | Nakajima . |
| 4,681,813 | 7/1987 | Yamada et al. . |
| 4,731,683 | 3/1988 | Otomo et al. . |
| 4,734,802 | 3/1988 | Higuchi et al. . |
| 4,779,486 | 8/1988 | Schumacher . |
| 4,784,015 | 11/1988 | Schumacher . |
| 4,796,127 | 1/1989 | Wada et al. . |
| 4,804,016 | 2/1989 | Novacek et al. . |
| 5,010,429 | 4/1991 | Taguchi et al. ............. 360/103 |

FOREIGN PATENT DOCUMENTS

| | | |
|---|---|---|
| 23517 | 2/1979 | Japan . |
| 139625 | 10/1980 | Japan . |
| 107363 | 8/1981 | Japan . |
| 227065 | 12/1984 | Japan . |

Primary Examiner—Thi Dang
Attorney, Agent, or Firm—Knobbe, Martens, Olson & Bear

[57] ABSTRACT

The present invention discloses texturing of the slider air bearing surfaces of the magnetic heads in disk drives to reduce stiction that retards take-off and displaces critical lubricant in a magnetic head system. One embodiment of the present invention utilizes nonuniform etching of chemically identical components of a ferrite slider material due solely to random crystal orientation relative to the exposed surface. Another embodiment of the present invention utilizes a photoresist of a type used in making printed circuit boards, to form a pattern. Subsequently, the surface may be etched to form the antistiction properties. A variety of controlled and reproducible patterns as well as a controlled depth of pattern may be utilized.

4 Claims, 5 Drawing Sheets

TEXTURED AIR BEARING SURFACE

This application is a divisional of application Ser. No. 07/481,556, filed Feb. 15, 1990, now U.S. Pat. No. 5,079,657.

FIELD OF THE INVENTION

This invention relates to the field of magnetic head systems. More particularly, the present invention relates to improvements for reducing stiction in a magnetic head system. More particularly, the present invention relates to an improved technique for reducing stiction by texturing the surface of the air bearing on the magnetic head slider which supports the magnetic head and lies opposite the disk surface.

BACKGROUND OF THE INVENTION

In conventional magnetic head systems, the magnetic head consists of an electromagnetic arrangement for writing, reading or erasing data on a magnetizable storage medium, movable relative thereto, such as a magnetic disk. Known kinds of magnetic head arrangements include ring electromagnets with an air gap, Hall effect components, magneto-resistive components and inductive electromagnetic arrangements. Typically, for use with a magnetic disk, the magnetic head is attached to a slider and lies opposite the disk surface.

Rotating magnetic disks of the type in which the magnetic head is in contact with the disk surface when the disk is at rest and flies above the disk surface when the disk is rotating at its operating speed are well known in the field. In such types of rotating magnetic disks, the magnetic head, which is supported on a slider, rides on a cushion or bearing of air above the disk surface when the disk is rotating at its operating speed. The slider is movable radially on the disk to be positioned over a selected one of a group of concentric recording tracks. The slider is carried on a suspension assembly connected ultimately to an actuator. The slider and its suspension during normal operation are relatively rigid, but are somewhat fragile when subjected to tangential forces.

Typically, in these conventional magnetic disks, the slider is biased against the disk surface by a small force from the suspension when the disk is not rotating. The slider is in sliding contact with the disk surface from the time that rotation of the magnetic disk is initiated, until the disk reaches a rotational speed sufficient to cause the slider to ride on the air bearing. The slider also contacts the disk surface when the rotation of the disk is slowed to a stop and the rotational speed of the disk falls below that necessary to create the air bearing.

In such magnetic disks, a lubricant is often maintained on the disk surface to prevent damage to the head and the disk during starting and stopping of the disk. An existing problem with such magnetic disks is that after the slider has been in stationary contact with the disk surface for just a short period of time, the slider tends to resist translational movement or stick to the disk surface. This adherence or "stiction" is known to be caused by a variety of factors, including static friction and viscous shear forces. However, "stiction" is aggravated by the presence of the lubricant material on the disk surface which tends to puddle up between the disk surface and the slider when the disk is not in motion and the slider rests on the disk surface. Even in those magnetic disks which have disks with extremely smooth unlubricated disk surfaces, stiction may occur because of the strong intermolecular attraction at the interface between the smooth disk and slider surfaces. "Stiction" causes severe damage to the head or disk when the slider suddenly breaks free from the disk surface, once disk rotation is initiated. Additionally, as the disk begins rotation, substantial forces, caused by "stiction," can be applied tangentially on the suspension, resulting in damage to or destruction of the suspension and possible damage to the disk surface.

In one known technique to overcome the stiction problem in such rotating disk systems, disk rotation is started very slowly so that the slider gradually breaks free from the disk surface. This approach is undesirable because it requires a relatively long period of time to bring the magnetic disk up to operating speed and additionally imparts tangential forces to the suspensions, which is the direction in which they are structurally weakest. In accordance with another technique, the slider and its suspension structure are moved a slight amount in each disk radial direction, a number of times, prior to applying power to rotate the disks at start up. This controlled micromotion has been found to be effective only in a few cases.

It is recognized that higher magnetic recording density requires correspondingly reduced head-to-disk spacing (flying height). At times, the head-to-disk spacing is so decreased that the magnetic head slider comes into contact with the magnetic disk surface frequently during the starting and stopping operation. Furthermore, the flying height may be so decreased that, even during the flying period, if the magnetic disk has flaws, such as tiny projections or dust on the surface, the magnetic disk may be contacted. Under these circumstances, the reliability of a magnetic recording device greatly depends on the sliding characteristics of the magnetic head slider.

To prolong system life, many approaches to the stiction problem have been proposed. Most of the proposals apply impregnation or coating of lubricating materials to the magnetic disk surface and may improve the slidability. However, with the impregnation of the lubricant in the porous voids in the magnetic disk surface, although an improvement in the slidability results, the head still adheres to the recording medium. If an excessively large amount of a liquid lubricant is applied on the top of the magnetic disk, stickiness between the head slider and the surface of the disk may actually increase. Consequently, not only the number and size of the porous voids in the slider must be controlled purposely, but also the viscosity and quantity of the liquid lubricant must be selected. This requires the use of extremely sophisticated manufacturing techniques.

Another approach addresses the stiction problem by scribing minute circumferential grooves on the magnetic disk substrate. However, this method limits maximum recorded densities by increasing media defects and noise production (spacing modulation) and results in increased manufacturing costs.

U.S. Pat. No. 4,549,238 describes a texturing technique for alumina-titanium carbide thin film heads using a $CF_4$ plasma etching process to selectively remove the surface layer titanium carbide particles. The intention of this process is to reduce the effective hardness of the slider instead of reducing stiction, and thereby reduce wear of the disk upon landing and taking off.

SUMMARY OF THE INVENTION

The present invention relates to an improved technique to reduce stiction which retards take-off and displaces critical lubricants in a magnetic head system. The present invention reduces stiction by texturing the surface of the magnetic head slider. With such texturing, the reliable life of both the disk and the magnetic head are significantly increased, while the data density, in bits per area unit of magnetic storage disks, increases since the distance between the magnetic head and disk surface may be reduced.

In accordance with one embodiment, the present invention utilizes nonuniform etching of chemically identical components of a ferrite slider material due solely to random crystal orientation relative to the exposed air bearing surface. This embodiment may also include the use of nonuniform etching of an inhomogeneous slider material such as that used in composite sliders.

In accordance with another embodiment, the present invention utilizes a photoresist, such as utilized in making printed micro-circuits, to form a pattern. The surface may then be etched to texture it according to the pattern to form the anti-stiction properties. Many controlled and reproducible patterns are possible, as well as controlled etching depth.

BRIEF DESCRIPTION OF THE DRAWINGS

The preferred embodiments of the present invention are illustrated in and by the following drawings in which like reference numerals indicate like parts and in which.

DETAILED DESCRIPTION OF THE PREFERRED EMBODIMENTS

Figure 1:
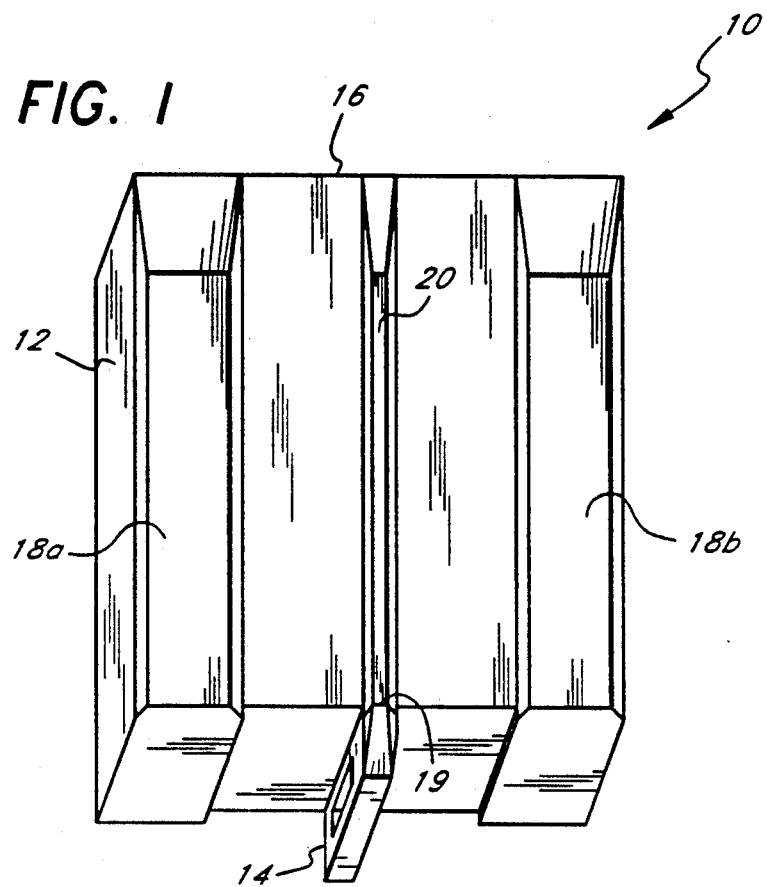
FIG. 1 is a perspective view of one example of a head core slier for a rigid magnetic disk drive illustrating the air bearing.

FIG. 1 illustrates generally a magnetic slider 10. The slider 10 may be either a monolithic slider composed of polycrystalline ferrites or a single crystal material such as ferrite. In addition, the slider 10 may also be formed of a composite material such as calcium-titanate with alumina. Any of the before-mentioned type sliders 10 are exemplary of bulk type core sliders utilized by a floatingtype magnetic head in a rigid magnetic disk drive. The slider 10 is integrally formed comprising a slider body 12 and a yoke portion 14. The yoke portion in cross section is C-shaped. A recording medium such as a magnetic disk rotates adjacent one surface 16 of the slider body 12. On the surface 16 are formed a pair of parallel air bearing portions 18a, 18b which are spaced apart and extend in the rotating or sliding direction of the magnetic disk. The sliding surfaces of the air bearing portions 18a, 18b have a predetermined height as measured from a recessed portion therebetween. The core slider 10 has a center rail 20 which is formed between the air bearing portions 18a, 18b. The center rail 20 serves as a track portion whose surface has the same height as the air bearing portions 18a, 18b. This track portion includes the magnetic gap 19 used for recording purposes. The magnetic gap 19 and yoke 14 may of course be located in any suitable position. For example, the center rail of the core slider 10 which carries the yoke 14 and the gap 19, may alternatively be omitted and the yoke 14 and gap 19 integrated with one of the side rails. In such a configuration, the side rails would continue to be air bearing surfaces.

Figure 2:
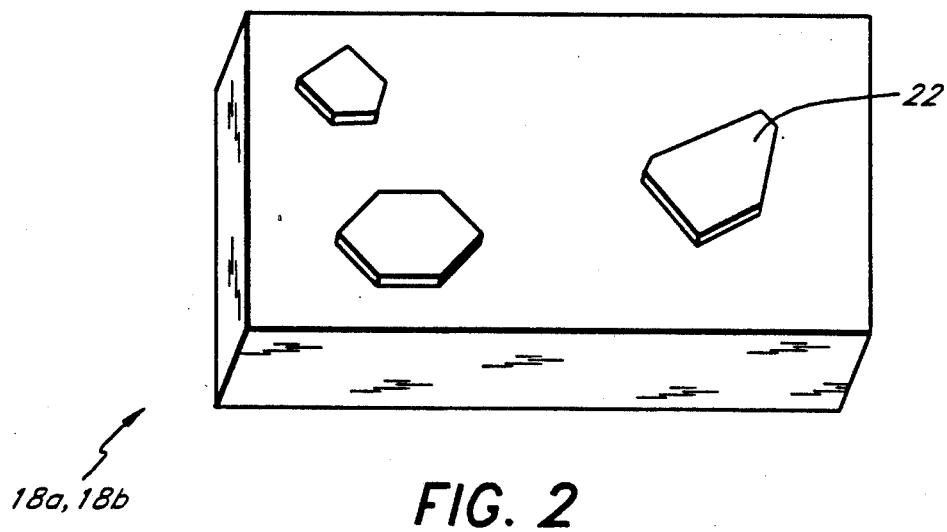
FIG. 2 is a magnified perspective view of a portion of the textured air bearing surface of the slider of FIG. 1 after undergoing the etching process in accordance with a first embodiment of the present invention.

Referring now to FIG. 2, in accordance with one preferred embodiment of the present invention, the surfaces of the air bearing portions 18a, 18b, which are formed of either polycrystalline ferrites for monolithic sliders or calcium-titanate with alumina for composite sliders, are textured by utilizing conventional etching techniques such as either chemical etching, reactive-ion etching or ion milling. By etching the surface of the air bearing portions 18a, 18b, the natural inhomogeneity and the mechanical anisotropy of the slider material produces randomly-shaped height variations 22 in random locations relative to the plane of the surface of the air bearing portions 18a, 18b. In an exemplary embodiment, typically for a material such as ferrite, the variations may advantageously be about 1 to 10 microinches in height from the average plane. Generally, the variations are preferably 0-100% of the grain size of the material. The textured surface results from the nonuniform etching rate of chemically identical components of ferrite slider material due solely to random crystal orientation relative to the exposed surface of the air bearing portions 18a, 18b. This embodiment may also include the use of the nonuniform etching rate of an inhomogeneous slider such as is used in composite sliders.

Referring now to FIGS. 3, 4, 5, and 6, a second embodiment of the present invention utilizes the uniform etching characteristics of single crystal material such as ferrite. Patterns which are enlarged for clarity in FIGS. 3, 4, 5, and 6, are created on the surface of the air bearing portions 18a, 18b, using conventional photolithographic techniques. An etching mask is formed of a positive or negative type photoresist, or formed of a suitable masking material such as Cr or SiO or SiO$_2$, by vacuum vapor deposition, sputtering, chemical vapor deposition (CVD), or other techniques known to those skilled in the art. This method of forming a mask and the material of the mask are suitably selected in terms of ease and cost of formation and the adhesiveness of the mask to the surface. The ferrite material partially covered by the etching mask is then subjected to an etching process to remove a suitable amount of stock from the non-masked portions of the surface. One such preferred method is described in greater detail at a later point in this application.

Figure 3:
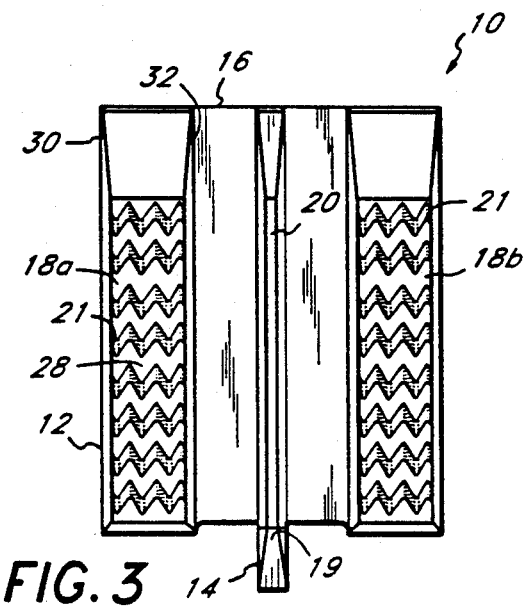
FIG. 3 is a plan view of the magnetic head slider illustrating a pattern created on the air bearing surface, in accordance with a second embodiment of the present invention.
Figure 4:
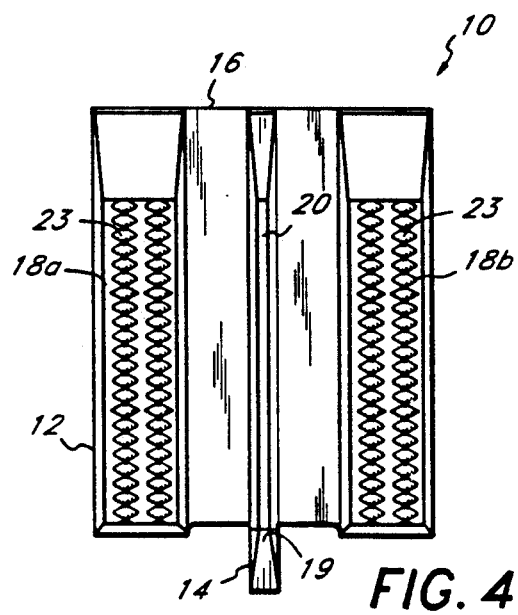
FIG. 4 is a plan view of the magnetic head slider illustrating an alternate pattern created on the air bearing surface, in accordance with the second embodiment of the present invention.
Figure 5:
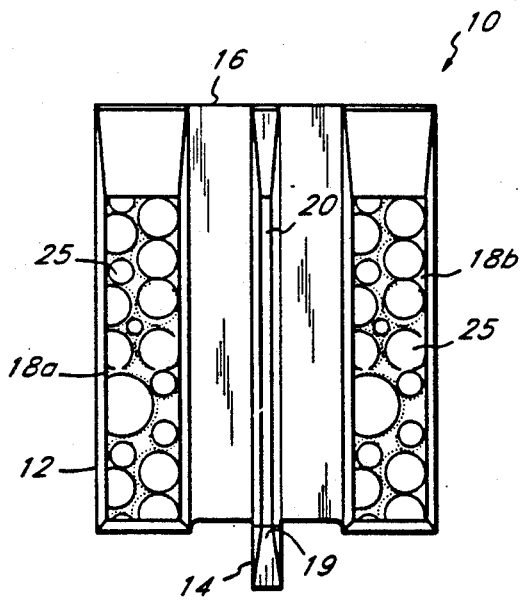
FIG. 5 is a plan view of the magnetic head slider illustrating another alternate pattern formed on the air bearing surface, in accordance with the second embodiment of the present invention.

The ferrite material is usually etched by an ordinary electrolytic etching or chemical etching method, such as chemical etching, laser-assisted chemical etching, reactive ion-milling, etc. A variety of controlled and reproducible patterns are possible. It is also possible to control the depth of the pattern. FIGS. 3, 4, 5 illustrate the surface of the air bearing portions 18a, 18b patterned in four different exemplary patterns. The second embodiment advantageously produces carefully controlled patterns of predetermined height with minimum material removal, with complete protection of the region around the gap 19, relatively independent of slider material composition and crystallographic variations.

Figure 6:
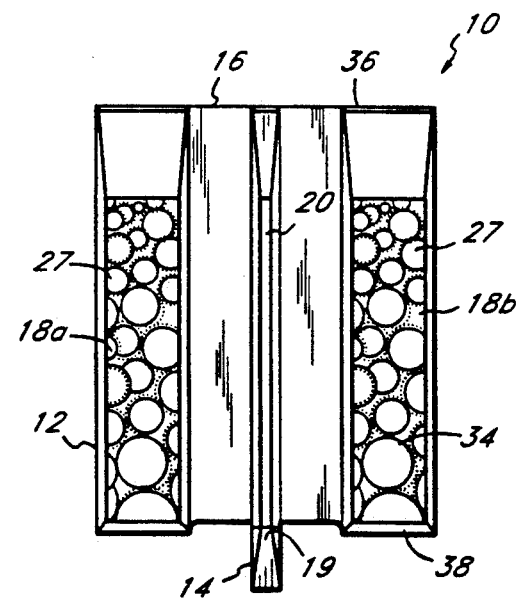
FIG. 6 is a plan view of the magnetic head slider illustrating a pattern varied on different regions of the air bearing surface, in accordance with the second embodiment of the present invention.

As shown in FIGS. 3 and 4, the etched patterns are preferably formed as repetitions of non-circular curves, as shown at 21 and 23. The surface may be textured with any pattern whereby a recessed area 28 of the pattern forms a continuous boundary connecting the edges of the air bearing and thus forming a path to facilitate fluid communication across the surface of the air bearing to distribute ambient pressure. For example, in accordance with the etched pattern shown in FIG. 3, at 21, the recessed portion 28 preferably extends continuously from an outer edge 30 to an inner edge 32. Alternatively, as shown in FIGS. 5 and 6, the etched patterns are preferably formed as regular geometric shapes of varying size, such as shown at 25 and 27. Furthermore, as shown in FIG. 6, at 27 and 34, it is possible that the pattern may vary in different regions of the air bearing surface. The etched pattern must advantageously provide a maximum reduction of stiction at a leading edge 36 as well as provide stability at a trailing edge 38. In accordance with this principle, the etched pattern may also have smaller geometric shapes at the leading edge and larger geometric shapes at the trailing edge. In the illustrated embodiment, the patterns are chosen to emulate a random variation. Although such randomness is advantageous, even uniform geometric patterning of the air bearing surface is advantageous in reducing stiction.

Figure 7:
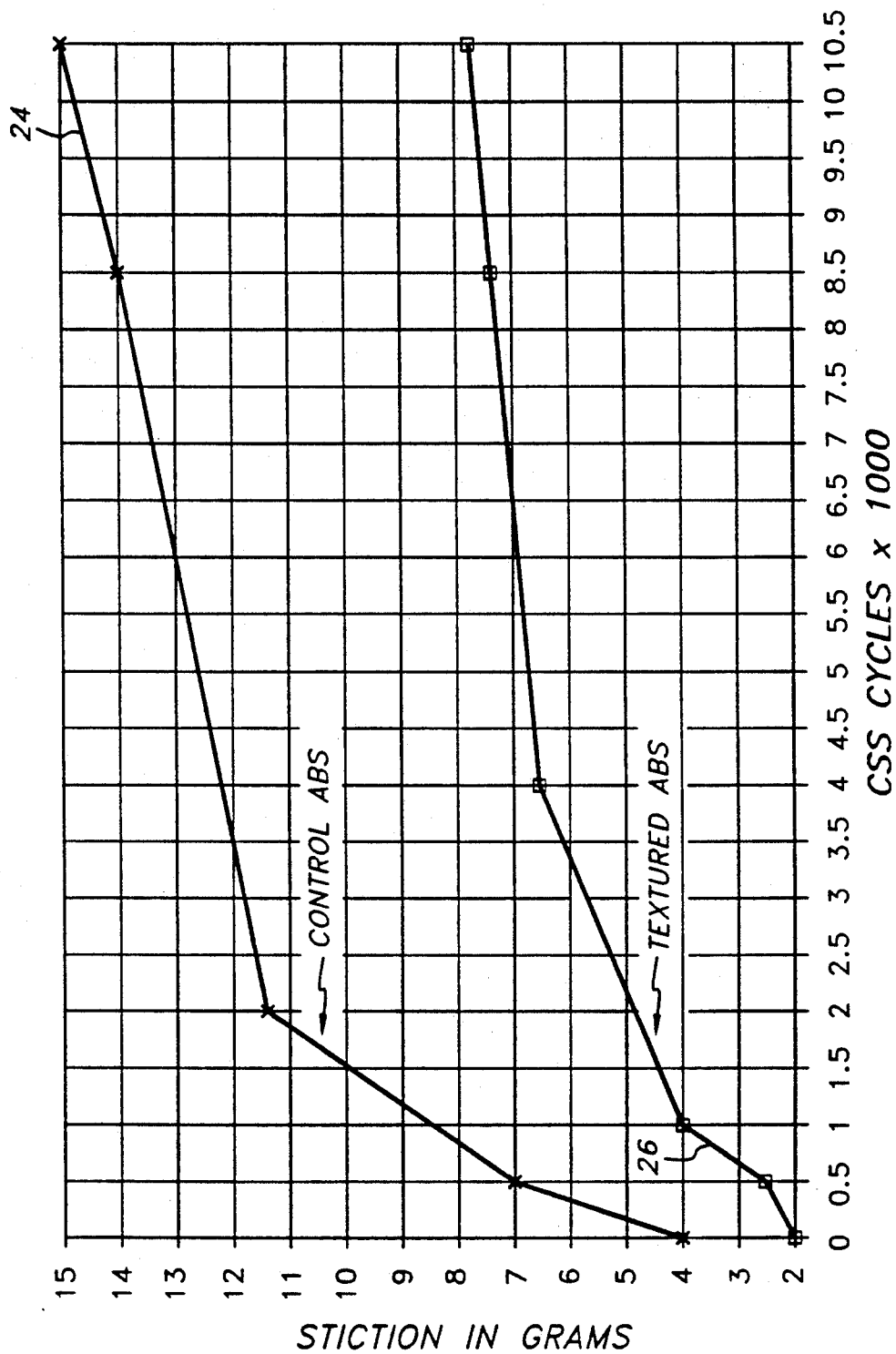
FIG. 7 is a graphical representation illustrating the extent by which the stiction is reduced by patterning the slider air bearing surface in accordance with the present invention.

Referring now to FIG. 7, exemplary values of stiction in grams along the x-axis are graphically represented versus CSS (contact-start-stop) cycles x 1000 along the y-axis. Line 24 represents the extent of stiction as experienced by conventional sliders with untextured air bearing surfaces. Line 26 represents reduced stiction achieved by the textured surfaces of the air bearing portions 18a, 18b. The results shown in FIG. 7 were achieved using the embodiment shown in FIG. 2 with a variation in height from the average plane of 2 microinches. This height variation was created using ion milling.

Although the reasons for the significant reduction in stiction, as shown in FIG. 7, are not completely understood, it is believed that at least some of the benefit is derived from:

A) limited-area contact between the air bearing surface and a static disk;
B) the tendency of the air bearing to wear in a way that causes different portions of the air bearing surface to contact the static disk over repeated use cycles; and
C) the tendency of the interface between the slider and disk to quickly achieve ambient air pressure by virtue of proximity of ambient pressure to the interface.

Figure 8:
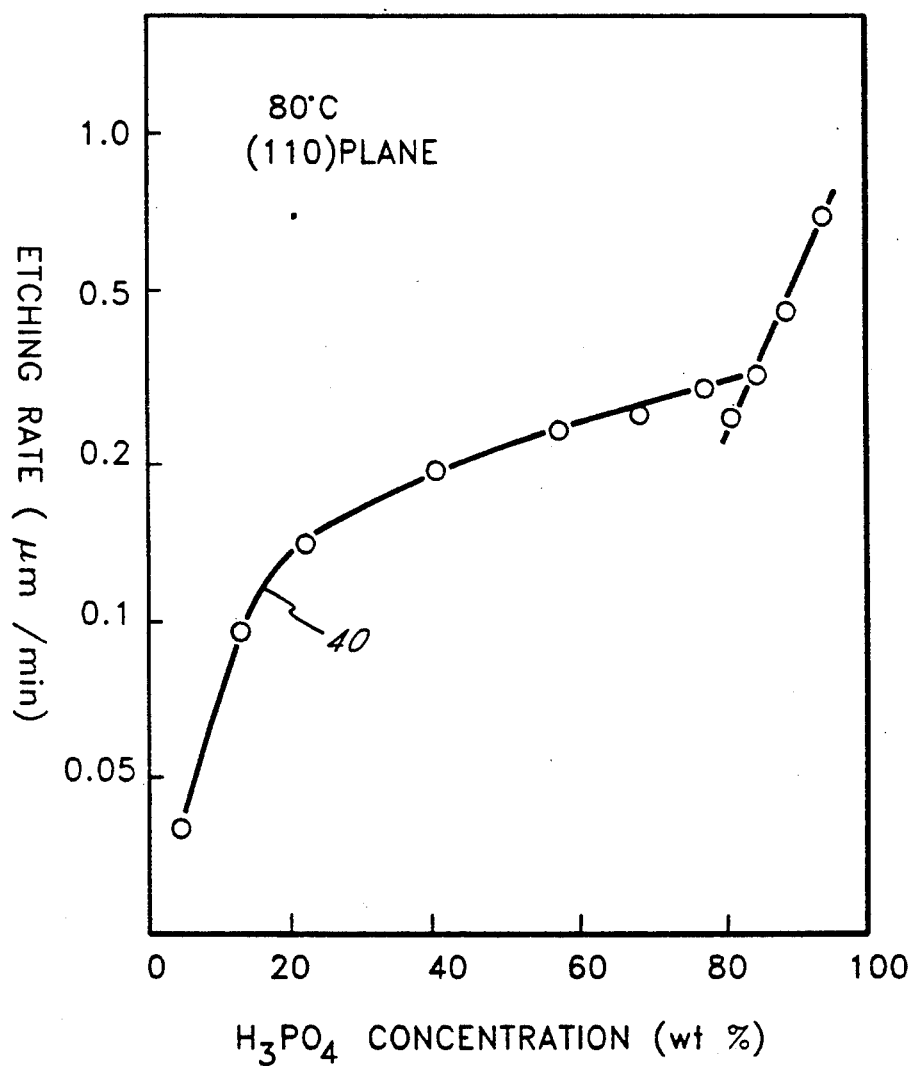
FIG. 8 is graphical representation illustrating a relationship between the concentration of a phosphoric acid solution and the etching rate, in accordance with a preferred etching technique. The illustrated relationship is for an exemplary plane (110) of the surface of a ferrite single crystal.
Figure 9:
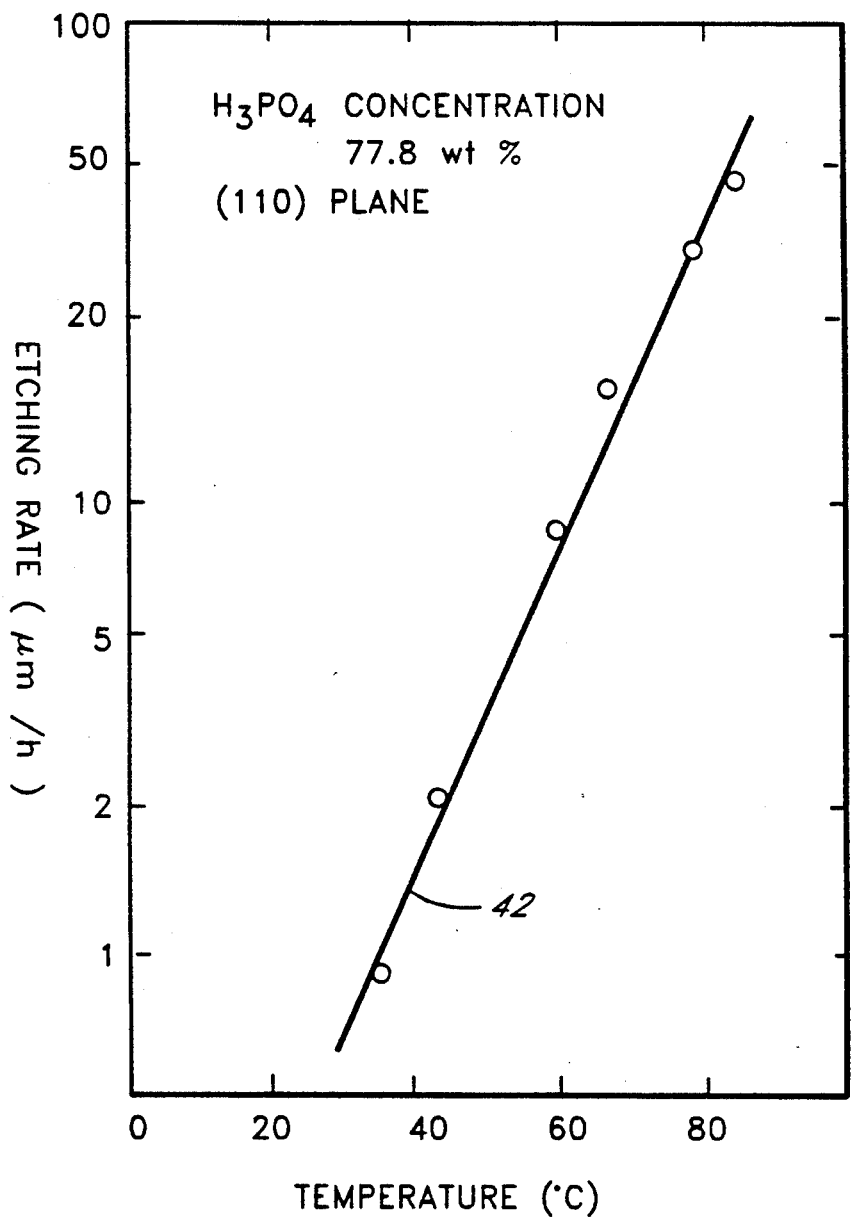
FIG. 9 is a graphical representation illustrating a relationship between the rate of etching with the phosphoric acid and the etching temperature in accordance with a preferred etching technique. The illustrated relationship is for an exemplary plane (110) of the surface of a ferrite single crystal.

Referring now to FIGS. 8 and 9, a preferred method of etching, which is both economical and provides an improved degree of dimension accuracy, is described in greater detail. Such a preferred etching technique makes it possible to form minute recesses, grooves or holes that cannot be formed by a conventional machining operation. In accordance with such a method, the surface of an exemplary Mn-Zn ferrite single crystal may be exposed to a solution which contains an amine compound, prior to forming the etching mask on the surface of the ferrite single crystal. Preferably, this preliminary treatment is carried out after the surface is cleaned with an organic solvent or pure water. The Mn-Zn ferrite single crystal may also preferably be annealed prior to the preliminary treatment. The amine compound is preferably selected from alkanol amines such as ethanol amine, diethanol amine or triethanol amine. However, it is also possible to use other amine compounds for example: aliphatic primary amines such as ethyl amine, propyl amine and butyl amine; aliphatic secondary amines such as diethyl amine and dipropyl amine; aliphatic tertiary amines such as triethyl amine; aliphatic unsaturated amines such as allyl amine; alicyclic amines; diamines; triamines; or aromatic amines such as aniline, toluidine and benzyl amine. The selected amine compound is generally used as an aqueous solution. The monocrystalline surface of the Mn-Zn ferrite is immersed in the aqueous solution and cleansed. The concentration and temperature of the amine compound and the immersion time are determined based on the specific amine compound used and the cleaning result desired. The above steps assure increased adhesion between the etching mask and the relevant surface of the Mn-Zn ferrite single crystal, thereby enhancing the dimensional accuracy of the texturing.

This method of etching may be applied to both a single crystal of ferrite or a monocrystalline portion of a Mn-Zn ferrite material. Where a monocrystalline portion of a Mn-Zn ferrite is used, an exposed monocrystalline surface is usually mirror-ground to a desired smoothness with a diamond abrasive grain, in a conventionally known manner. The diamond abrasive used preferably has a grain size of four microns or less. This preliminary surface treatment of the monocrystalline surface is advantageous because a rough monocrystalline surface prior to the etching process produces undesirable effects even if the chemical etching process occurs uniformly over the entire surface area.

A strain adjacent to the surface of the ferrite single crystal to be chemically etched lowers the etching rate of the surface and degrades the dimensional accuracy of the etched crystal. Therefore, it is recommended to remove such a strain prior to the chemical etching process. This may be accomplished by preliminary chemical or ion-beam etching, or annealing (heat treatment) in an inert atmosphere such as N$_2$. Advantageously, both the preliminary etching and the annealing are performed for improved results. The annealing operation is generally carried out at a temperature between 200° C. and 600° C., advantageously, between 250° C. and 550° C., for at least 30 minutes. In cases where the Mn-Zn ferrite bar has a glass filler at a magnetic gap or other portions, the upper limit of the annealing temperature is below the melting point of the glass filler.

Alternatively, the preliminary treatment with the amine compound solution may be replaced by a preliminary treatment with a solution of phosphoric acid, which is also effected prior to the application of the etching mask to the surface of the Mn-Zn ferrite single crystal. By this preliminary etching, the Mn-Zn ferrite surface on which the etching mask is formed is etched to a depth of at least 10 angstroms. The phosphoric acid concentration, the etching temperature and the immersion time are determined in accordance with the desired etching depth.

After the monocrystalline surface of the Mn-Zn ferrite is subjected to a preliminary treatment with a solution containing an amine compound or phosphoric acid, the appropriate etching mask is formed on the treated surface, by any known method such as screen printing, or the like. Such a method is selected according to the patterning accuracy and cost required. In accordance with one method, the etching mask may advantageously be formed by exposing a layer of a photo resist to radiation through an appropriate photomask. The photo resist may be either a positive type or a negative type. The etching mask may be formed of a suitable metal such as Cr, or SiO or $SiO_2$, by vacuum deposition, sputtering or CVD. The degree of adhesion of the mask to the ferrite surface, the ease and the cost of forming such a mask are contributing factors which determine the type of material and method used in forming such a mask.

The monocrystalline surface of the Mn-Zn ferrite with the appropriate etching mask is then subjected to a chemical etching process. The chemical etching process to form the pattern is carried out, most preferably by using an aqueous solution consisting of water and mainly phosphoric acid. A small amount of other acids such as sulfuric acid may also be used in addition to phosphoric acid. If the content of phosphoric acid is 80% or more with respect to the entire amount of the acids contained in the aqueous solution, the balance is considered to be mainly of phosphoric acid.

Referring now to the graph of FIG. 8, there is shown a relationship, at 40, between the concentration of phosphoric acid in the aqueous solution and the etching rate for a surface in the (110) plane, as an example. As clearly shown in the graph, the etching rate is very high when the phosphoric acid concentration exceeds 80%. It can also be noted that when the concentration exceeds 80% the rate of increase is exponential. In such cases, it is rather difficult to accurately control the etching amount. The etching rate is also influenced by the etching temperature, as indicated at 42, in the graph of FIG. 9. It is desireable to maintain the etching time at a minimum because where the etching mask is formed of a photo resist, the adhesion between the etching mask and the ferrite surface is decreased due to expansion of the photo resist during the period that it is immersed in the etching solution. Additionally, it is also desireable to minimize the etching time, for improved dimensional accuracy of the etched portion.

If the etching temperature exceeds 90° C., the amount of an aqueous component of the etching solution containing phosphoric acid changes to an appreciable extent, and the temperature distribution within the etching solution becomes uneven, whereby the etching amount considerably differs at the local areas of the ferrite surface. For this reason, the etching temperature should be 90° C. or lower, preferably ranging between 50° C. and 90° C.

Since the etching rate is very low when the phosphoric acid concentration is 5% or lower as indicated in FIG. 8, the concentration of phosphoric acid in the etching solution should preferably be maintained between 5-80%. However, the etching temperature and the phosphoric acid concentration of the etching solution may not be limited to those indicated above, particularly when the amount of etching is comparatively smaller and when the etching mask has a high degree of adhesion to the ferrite surface. In this case, other factors also contribute to achieve optimum etching conditions.

Although the invention has been described in terms of the preferred embodiments, other embodiments that are apparent to those of ordinary skill in the art are also within the scope of the invention. Accordingly, the scope of the invention is intended to be defined only by reference to the appended claims.

What is claimed is:

1. A method of manufacturing a sliding surface on an air bearing portion of a head core slider for a magnetic disk drive, comprising the steps of:
    polishing said sliding surface to the desired smoothness; and
    chemically removing 1 to 10 microinches of material from selective regions of said air bearing portion to form a series of recesses in said air bearing portion in accordance with a controlled and reproducible pattern.

2. The method of manufacturing a sliding surface on an air bearing portion of a head core slider for a magnetic disk drive as defined in claim 1, further comprising selecting said regions for removal of material so that said removing step results in a pattern of continuous boundaries of varying sizes.

3. The method of manufacturing a sliding surface on an air bearing portion of a head core slier for a magnetic disk drive as defined in claim 1, further comprising selecting said regions for removal of material so that said removing step results in a pattern of closed geometric forms of a single shape and varying sizes.

4. The method of manufacturing a sliding surface on an air bearing portion of a head core slider for a magnetic disk drive as defined in claim 1, further comprising selecting said regions for removal of material so that said removing step results in a pattern of closed geometric forms of different shapes.

* * * * *

UNITED STATES PATENT AND TRADEMARK OFFICE
CERTIFICATE OF CORRECTION

PATENT NO. : 5,162,073
DATED : November 10, 1992
INVENTOR(S) : Aronoff, et al

It is certified that error appears in the above-indentified patent and that said Letters Patent is hereby corrected as shown below:

Column 8, line 51, claim 3, please replace "core slier" with
-- core slider--;

Signed and Sealed this

Twenty-second Day of July, 1997

Attest:

BRUCE LEHMAN

*Attesting Officer*     *Commissioner of Patents and Trademarks*